July 11, 1967 J. F. SHERRILL 3,330,570
LOAD LEVELING SHOCK ABSORBER
Original Filed Nov. 8, 1963 2 Sheets-Sheet 1
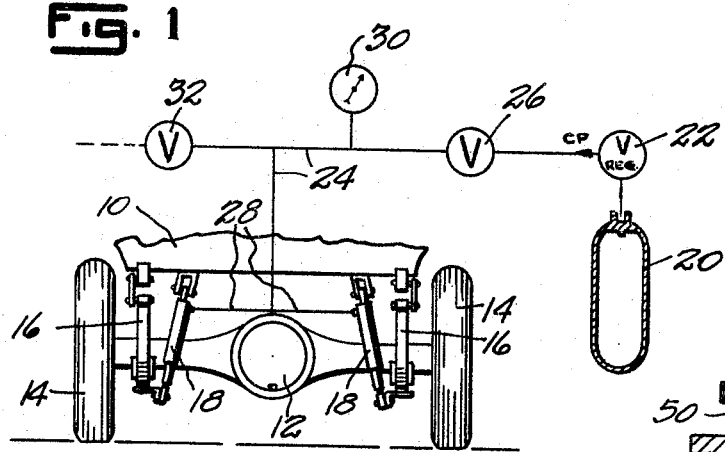
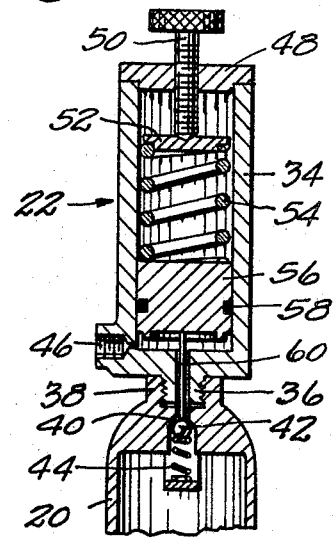
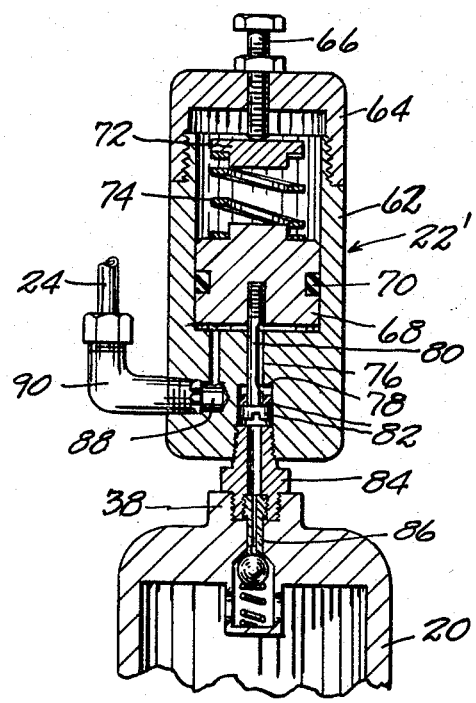
INVENTOR.
JOHN F. SHERRILL
BY
ATTORNEY

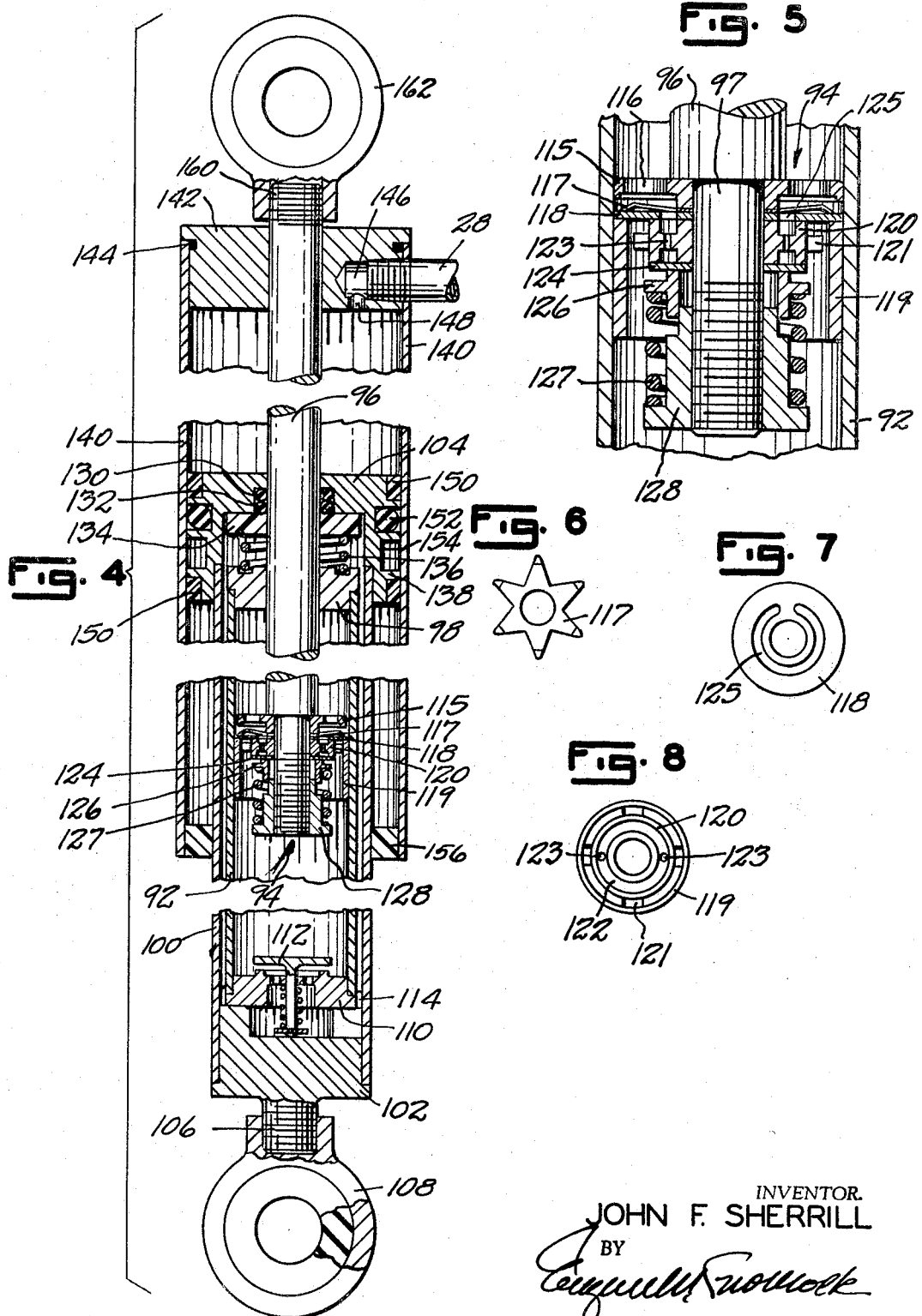

United States Patent Office 3,330,570
Patented July 11, 1967

3,330,570
LOAD LEVELING SHOCK ABSORBER
John F. Sherrill, Plymouth, Ind., assignor to Level-Aire Corporation, Toledo, Ohio, a corporation of Ohio
Continuation of application Ser. No. 322,300, Nov. 8, 1963. This application June 10, 1966, Ser. No. 574,842
10 Claims. (Cl. 280—6)

This invention relates to a load leveling shock absorber. This application is a continuation of my co-pending applicaton, Ser. No. 322,300, filed Nov. 8, 1963, now abandoned.

Vehicles which are subject to variable loading present problems when the loading thereof is changed with respect to stability, ride smoothness, wheel contact with the road, tire wear, side sway, focus of vehicle headlights, damage resulting from the bottoming out of a shock absorber having an insufficient stroke to accommodate road shock dampening or absorbing action, and insufficient road clearance when traveling in snow or in ruts. Various means have been utilized in devices available heretofore to meet these problems and conditions. Thus sometimes overload springs are mounted upon a vehicle. These are effective to meet the overload condition but render a vehicle equipped with them uncomfortable when driven without a load. Pneumatic means have also been utilized to provide a gas charge supplementing the springs of the vehicle as a means to produce a proper attitude and riding condition of a loaded vehicle, but such devices usually require charging at a service station or other location at which an air compressor is available, and have usually been subject to service requirements which have made adjustment thereof to meet varying load conditions time-consuming and laborious.

It is the primary object of this invention to provide a load leveling shock absorber which effectively overcomes the limitations and disadvantages of prior devices and which makes possible rapid and accurate adjustment of a vehicle to compensate for a load variation in a manner to overcome the disadvantages which normally characterize an overloaded vehicle.

A further object is to provide a shock absorber usable upon vehicles subject to variable loading, which is capable of rapid adjustment in a simple manner by power under fingertip control to condition itself to the loaded condition of the vehicle for normal shock absorbing functioning thereof.

A further object is to provide a shock absorber with means for extending and shortening the same at will and in a manner which does not reduce the shock dampening action thereof.

A further object is to provide a shock absorber with means for varying the load-carrying capacity thereof rapidly and without impairing shock-absorbing functioning thereof upon both shock loading and rebound thereof.

A further object is to provide a shock absorber including an hydraulic shock-absorbing unit, a gas charged unit cooperating with the hydraulic unit and functioning to control the length of the unit and to control the position of the associated vehicle and means for varying the charge of gas applied to the gas charged unit.

Other objects will be apparent from the following specification.

In the drawings:

FIG. 1 is an end view of the undercarriage of a vehicle, illustrating schematically the control for my improved load-leveling shock absorber forming a part of said carriage;

FIG. 2 is an axial sectional detail view of one embodiment of regulating valve usable with my improved shock absorber;

FIG. 3 is an axial sectional view illustrating another embodiment of a pressure regulating valve usable with my load-leveling shock absorber;

FIG. 4 is an axial sectional view of my improved load-leveling shock absorber construction per se;

FIG. 5 is an enlarged fragmentary axial sectional view of a valve construction used in the hydraulic section of my new shock absorber;

FIG. 6 is a plan view of a spring disk used in the shock absorber;

FIG. 7 is a plan view of an apertured disk used in the hydraulic valve; and

FIG. 8 is an end view of a slidable disk used in the shock absorber valve.

Referring to the drawings which illustrate the preferred embodiment of the invention, the numeral 10 designates the body of a vehicle which is mounted upon suitable running gear. The running gear includes rear axle 12 and wheels 14. The vehicle is provided with springs 16 interconnecting the body 10 and the axle 12 in the manner well understood in the art and serving to provide a yielding support of the vehicle body upon the running gear of the vehicle. Shock absorbers 18 also provide an interconnection between the axle 12 and the body 10 and serve to snub or damp the action of the springs when the vehicle travels over rough terrain.

My improved shock absorbers 18 are adapted to provide the additional function of adjustment for the purpose of leveling a vehicle which is subjected to overload. For this purpose the shock absorbers 18 are connected in a gas supply system, as illustrated schematically at FIG. 1. This gas supply system includes a charged gas container 20, such as a conventional $CO_2$ bottle which may be charged at a pressure in the order of 1000 pounds per square inch or any other selected pressure charge. The container 20 will be mounted in the vehicle at any convenient location. A pressure regulator 22 has connection with the charged gas container 20 for the purpose of regulating or limiting to a selected value the pressure of the gas which is discharged from the container to a supply line 24. The supply line 24 has interposed therein a gas supply valve 26 which preferably is adapted for fingertip operation and which is located in the vehicle in a convenient position, as at the dash thereof. The valve 26 is normally closed and, when operated, opens the supply line 24 to feed therein, and to lines 20 connected to the shock absorbers 18, gas under pressure supplied from the container 20. The gas supply system also preferably includes a pressure gauge 30 located convenient to view by the operator while he manipulates the valve 26, and for this purpose the gauge 30 will preferably be located at or adjacent to the dash of the vehicle. A manually controlled bleed valve 32 is also connected to the gas supply system and is normally closed but is adapted to be manually opened for the purpose of bleeding gas under pressure from the supply line 24, the gas feed line 28, and the shock absorber 18 at the will of the operator. Bleed valve 32 is preferably conveniently located in the vehicle, as at the dash thereof.

One form of pressure-regulating valve 22 which serves to limit the pressure at which gas is supplied from the container to the line 24 is illustrated in FIG. 2 and includes a cylindrical body 14 which has a screw-threaded neck 36 having a screw-threaded connection in the internally screw-threaded outlet neck 38 of the container 20.

Container 20 has an outlet passage opening at the neck 38 and including a valve seat 40 against which a valve element 42 is normally seated by a spring 44. The regulator valve body 34 has a lateral output port 46 at its lower end, that is, the end threof adjacent the neck 36 thereof. At its opposite end 48 the regulator body is screw-threaded to receive a manual adjusting screw 50 preferably having a knurled head. The tip of the screw 50 bears against a spring-adjusting disk 52 by means of which the compression of a coil spring 54 which in turn bears against a piston 56 is controlled. Piston 56 has a circumferential seal 58, such as an O-ring, which prevents leakage of gas under high pressure past the piston 56. The piston 56 carries an elongated plunger 60 which passes with clearance through a central opening in the neck 36 of the regulator body 34 and into the outlet of the gas container 20 to bear against and unseat the valve member 42 from the valve seat 40.

This embodiment of the pressure regulator entails unseating of the valve 42 at the outlet of the gas container 20 when the regulator body 34 is mounted at the outlet neck 38 of the container with the valve body neck 36 screw-threaded therein. Suitable seals are provided to prevent leakage between the interconnected neck portion 36 and 38. Gas under pressure from the charge in the container 20 flows past the unseated valve 42 and around the stem or plunger 60 to enter the regulator valve body 34 and to flow therefrom through the outlet 46 in the supply line 24. The gas in the body 34 also acts against the piston 56 to shift the same against the action of the spring 54. When the charge of pressure collected in the regulator body 34 reaches a value which displaces the piston 56 more than a predetermined extent, the plunger 60 is withdrawn from contact with the valve element 42 of the container 20 so that the valve element 42 reseats and the gas container is sealed. The pressure at which this closing of the charged container from the supply line occurs depends upon the setting of the adjusting screw 50 and the resultant compression of the spring 54.

An alternate embodiment of a pressure regulating valve 22' is illustrated in FIG. 3. This valve has a cup-shaped valve body 62 mounting a cap 64 having a central screw-threaded aperture receiving an adjusting screw 66. A piston 68 is shiftable in the body 62 and has a circumferential seal 70. A spring retainer disk 72 is engaged by the inner end of the adjusting screw 66 and bears against a coil spring 74 which in turn bears against the piston 68. The closed end of the cup-shaped body 62 has an axial bore 76 formed of two different diameters so as to provide a valve seat or shoulder 78 intermediate its length. A valve pin 80 is carried by the piston 68 and extends slidably through the reduced diameter portion of the axial body bore 76 and terminates in an enlarged valve head 82 adapted to bear against the valve seat 78 for the purpose of sealing the axial body bore 76 at the valve seat. A fitting 84 is screw-threaded in the outer end of the bore 76 of the regulator body 62 and is threaded into the tubular neck 38 of the gas charged container 20. The fitting 84 includes a tubular extension 86 adapted to engage and unseat the container valve element 42 and to accommodate flow therein when said valve element is unseated. The end of the regulator body has an outlet port 88 at which is connected an outlet fitting 90 in turn connected with the supply line 24.

This embodiment of pressure regulator functions similarly to that previously described in that the piston 68 responds to gas pressure flowing from the container 20 through the tubular extension 86, the fitting 84 and the axial bore 76 of the body of the regulator, past the valve head 82. Gas under pressure which enters the regulator body 62 discharges through the outlet port 88 and the outlet fitting 90 to the line 24, and also acts against the piston 68 to overcome the resistance of the springs 74. When a pressure is built up in the body 62 sufficient to compress the spring 74 to a predetermined extent, the valve head 82 seats against the valve seat 78 and closes communication between the chamber 20 and the regulator body and thereby limits the gas pressure in the regular body and the supply line 24.

The shock absorbers per se are preferably of a construction as illustrated in FIG. 4. Each is formed of a hydraulic unit or component and a gas charged unit or component. The hydraulic unit or component may be substantially of conventional construction. The basic components of the hydraulic unit constitute a cylinder or housing 92 within which is slidably mounted a piston unit 94 having a piston rod 96 which extends through an apertured end plate or disk 98 mounted on one end of cylinder 92. An outer cylinder 100 fits with clearance around the cylinder 92 in concentric relation thereto and has opposed end members 102 and 104 fixedly mounted thereon to define a reservoir for hydraulic fluid between the cylinders or tubes 92 and 100 and in communication with the interior of the tube 92. The end disk 104 has a central aperture to slidably receive the piston rod 96. The opposite end 102 of tubular member 100 has a screw-threaded shank 106 upon which is threaded replaceably or detachably a mounting or connector member 108, by means of which the shock absorber 18 is connected at one end, preferably its lower end, to the vehicle, as at the axle 12.

The inner cylinder or tube 92 preferably has a centrally apertured end wall 110 in which is mounted a valve 112 normally spring-urged toward closed position and adapted, when the parts are in assembled position, to be unseated by contact with the end 102 of the outer cylinder or tube which has passages therein providing communication with the reservoir space between the inner and outer tubes 92, 100. Spacer means 114 are interposed between the inner tube 92 and the outer tube 100 to center the lower free ends thereof without restraining flow of liquid in the reservoir.

One form which the valve 94 of the hydraulic unit may take is illustrated in FIGS. 4 and 5, wherein the valve construction is mounted upon the reduced screw-threaded end portion 97 of piston rod 96, which reduced part 97 is partially screw-threaded. An apertured disk 115 bears against the shoulder between the rod parts 96 and 97 and has a circumferential series of apertures 116 and a central hub portion of increased thickness against which bears the central portion of an apertured star-shaped spring member 117 whose outer extremities are preferably angularly bent. Disk 118 bears against the star spring 117. A sleeve 119 has a sliding fit in tubular cylinder 92 and carries at its upper end, as seen in FIG. 5, an annular part 120 spaced therefrom by lugs 121. Annular part 120 has an annular recess defining a reduced thickness web portion 122 in which is formed one or more apertures 123 having a low flow capacity compared to the apertures 116 of disk 115. An arcuate slot 125 in disk 118 registers with the recess at which the apertures 123 are formed. An apertured disk 124 is pressed against the annular part 120 opposite that which engages the disk 118. A spring follower 126 bears against disk 124 and is pressed against by a coil spring 127 whose opposite end abuts a flange of a nut 128 threaded on the reduced end 97 of the piston rod.

The valved piston 94 functions substantially as follows. Upon flexing of the vehicle springs 16 to reduce the spacing between the vehicle body 10 and the axle 12 so as to move the piston rod 96 downwardly as viewed in FIGS. 4 and 5, the disk 118 is unseated from the member 119, 120 by the resistance of the liquid in the lower part of the cylinder 92 to the movement of the piston valve 94. Liquid flows through the slot 125 of the disk 118 and the apertures 116 of the disk 115 to enter the upper part of the tubular cylinder 92 above the valve piston. Upon the reverse movement of the piston rod 96 and its piston 94 incident to rebound of the vehicle springs 16, the disk 118 reseats on part 119, 120 and flow of liquid from the upper part of the cylinder 92 through the valve piston occurs through apertures 116 of the disk 115, slot 125 of disk 118, restricted apertures 123 of part 119, 120 to apply pressure against the disk 124 to unseat the same against the action of the spring 127. In this way a snubbing of spring rebound is produced.

The end member 104 mounted on the outer cylinder 100 has a central passage therethrough for sliding reception of piston rod 96 therein. This aperture includes an elongated enlarged bore 130 open at its inner face and adapted to receive a pair of O-rings 132 with a fit which applies a circumferential squeeze upon said O-rings. The length of the elongated enlarged bore 130 is preferably slightly less than twice the diameter of an O-ring 132. An apertured disk 134 bears against the inner face of the member 104 and against the innermost O-ring 132 and preferably applies a slight squeeze to the two O-rings 132 in a direction parallel to the axis of the piston rod 96. I prefer to interpose a coil spring 136 between the end disk 98 of the inner tube 92 and the apertured disk 134. However, this is not essential and direct pressure of disk 98 may be employed to hold the apertured disk 134 in its operative position pressed against the inner face of the end disk 104.

The end member 104 of the outer tube 100 preferably has a skirt portion 138 within which one end of the tube 100 has a sealed fit. The fit between tube 100 and sleeve 138 and between tube 100 and end member 102 may be a drive fit and a bonding agent may be employed in conjunction with said drive fit to insure against leakage at the ends of the tube 100. Any suitable means to provide a leak-proof connection between the inner tube 92 and the end members 98 and 110 may be provided and this preferably will constitute a pressed fit supplemented by a bonding agent.

The gas pressure charged part of the shock absorber construction utilizes a tubular member 140 telescoped around one end portion of the tube 100 and receiving slidably therein the end member 104 on said tube 100 so as to act as a piston in the gas tube 140. The gas tube 140 mounts and member 142 which has an aperture therethrough within which the piston rod 96 fits and with which the piston rod 96 has fixed connection as by a bond which provides a seal between the rod 96 and the member 142. One end portion of the tube 140 fits around a reduced diameter portion of the member 142 and has a pressed and bonded fit therewith. Also, if desired, a sealing member 144 may extend circumferentially to provide a seal between the member 142 and the end portion of the tube 140. The end member 142 has a screw-threaded lateral port 146 inwardly of the seal 144 and extending also through the end portion of the tube 140 so as to receive a fitting (not shown) on the end of the gas feed line 28. Suitable gasket means (not shown) may be provided to assure a seal between the port 146 and the fitting of gas feed line 28. The port 146 has a part 148 open at the inner face of the member 142 for delivery of gas under pressure from the feed line 28 into the tubular member 140.

The end member 104 mounted upon the tube 100 and the skirt portion 138 thereof constitutes a piston which preferably has an outer diameter with a slight clearance within the bore of the tube 140. The opposite ends of this piston unit are of reduced diameter and mount thereon centering rings 150 of slightly larger outer diameter than the piston parts 104 and 138. The centering rings 150 have a snug sliding fit in the tube 140 and are preferably formed of a self-lubricating synthetic material, such as Teflon or Duralon or of any other material, such as a synthetic resin having properties of self-lubricity. Intermediate the entering rings the skirt 138 of the piston part 104 has a circumferential groove which receives a resilient annular sealing member 152, such as an O-ring. A second circumferential groove 154 is positioned between the groove receiving the seal ring 152 and one of the centering rings 150, and this groove is adapted to receive a lubricating medium, such as a lubricating gland (not shown). The free end of the tubular member 140 which telescopes the tubular member 100 carries a spacer ring 156 therein, having a sliding and guiding fit upon the tube 100.

The free end of the piston rod 96 is screw-threaded at 160 and is positioned externally of the end member 142. A mounting or connector member 162 is detachably mounted upon the piston rod end 160. The members 162 and 108 may be of any type conventionally used in vehicles of different constructions and manufacture for connection of a shock absorber to a vehicle. These mounting members preferably will be supplied separately from the shock absorber per se so that mounting members of required character may be applied to the shock absorber at the point of use, thus reducing the number of assemblies which must be carried in stock by a garage or service station in order to meet the requirements of vehicles of different types and manufacture requiring different types of mounting means.

In the use of the device the shock absorbers per se are connected, as illustrated in FIG. 1 at 18, between the axle 12 and the body 10 of the vehicle and are connected to the gas supply system at the gas inlet lines 28 thereof, which in turn are connected by lines 24 to a charged gas tank 20, charged at high pressure and whose rate of discharge is controlled by the regulator 22. The device may be used for normal vehicle operation in the same manner as any hydraulic shock absorber. In this connection the overall length of the shock absorber, that is, the spacing between the mounting members 108 and 162 thereof, will be determined by the normal spacing of their connection points as controlled by the extent to which the vehicle springs 16 are flexed under the weight of the vehicle body 10. The cylinders 92 and 100 contain hydraulic liquid, such as oil, which is caused to flow from one side of the piston 94 to the other incident to flexing of the spring when the vehicle travels over rough terrain. The piston 94 serves the function of retarding the rate of flow of liquid therethrough upon rebound to a greater extent than it is retarded upon initial spring flexure and thus accomplishes the normal shock damping, snubbing or absorbing function of a vehicle shock absorber. Under such conditions it will be apparent that the gas pressure charge portion of my device is inoperative.

Whenever the vehicle is overloaded to the extent that excessive flexing of the springs 16 occurs to reduce the spacing between the body 10 and the axle 12 to an undesired extent, the gas pressure portions of the shock absorbers may be brought into play for opening the valve 16 to permit a charge of gas from the container 20 to flow through the supply lines 24 to the gas feed lines 28 and to enter the tubular cylinder portions 140 of the shock absorbers. The gas charge introduced into the tubular cylinder portions 140 acts to supplement the vehicle body supporting function of the springs 116 and to elongate the shock absorbers. This changes the attitude of the vehicle, restoring the body to substantially level position so that normal vehicle functioning results. At the same time no impairment of the use of the hydraulic portion of the shock absorbers for their normal function to contract the then increase in length incident to flexing of the springs 16 of the vehicle occurs. It will be apparent that the charge of gas in the tube cylinders 140 continues at all times to supplement the vehicle-supporting function of the springs 16. Leakage of the gas charge from the tubular cylinder 140 is prevented by the seals 144 and 152 and also by the seal 130. The latter seal serves the additional function of preventing entry of gas under high pressure into the hydraulic unit of the shock absorber. Thus the integrity and functioning of the hydraulic portion of the shock absorber is insured when the shock absorbers 18 are charged with gas at high pressure as well as at such times as the shock absorbers contain no charge of gas at high pressure.

It will be apparent that whenever an overload condition terminates, the vehicle can be restored to normal position with its shock-snubbing action limited to the hydraulic part of the shock absorbers by the simple expedient of opening the bleed valve 32 to release gas under pressure from the cylinders 140. Likewise, if loading is reduced from a high overload condition to a medium overload condition, compensation for the difference in the extent of overload can be had by opening the valve 32 to bleed from the cylinders 140 a part only of their charge of gas as to reduce the gas charge therein to that value required to supplement the action of the vehicle springs 16 for the purpose of maintaining the desired position of the vehicle body 10, that is, the desired spacing of the body 10 from the rear axle 12.

While the preferred embodiment of the invention has been illustrated and described, it will be understood that changes in the construction may be made within the scope of the appended claims without departing from the spirit of the invention.

I claim:

1. A load leveling shock absorber for a vehicle comprising a closing hydraulic unit including a cylinder, an apertured piston unit accommodating liquid flow therethrough at different rates in opposite directions and a piston rod slidably projecting from said cylinder, a seal carried by said cylinder and encircling said piston rod, a concentric circular enlargement on said cylinder adjacent the end thereof at which said rod projects, an annular seal encircling said enlargement, a tubular member carried by the projecting part of said rod and slidably encircling said enlargement and seal, said tubular member having a closed outer end, gas inlet means for supplying gas at high pressure to said tubular member, and a guide ring carried by the end of the telescoping portion of said tubular member and slidable on the cylinder of said hydraulic unit.

2. A load leveling shock absorber for a vehicle comprising a closed hydraulic unit including a cylinder tube, an apertured piston slidable in said tube, a reservoir tube encircling said cylinder tube with clearance and closed at one end and a piston rod projecting from said tube, a disk sealing and projecting circumferentially from the opposite end of each reservoir tube and having a central stepped aperture slidably receiving said rod, annular resilient sealing means seated in said stepped disk aperture and radially squeezed therein, means for imparting a slight squeeze to said resilient sealing means parallel to said rod, said last named means including an apertured disk carried by said cylinder tube and slidably receiving said piston rod, a gas pressure tube closed at one end and carried by said piston rod, said gas pressure tube having a sliding sealed fit around said reservoir tube and disk, and gas inlet means for supplying gas under high pressure to said gas pressure tube.

3. A device defined in claim 2, wherein said reservoir tube sealing disk has a circumferential groove and an annular resilient sealing ring seated in said groove.

4. A device as defined in claim 2, wherein said reservoir tube sealing disk has a pair of spaced circumferential grooves, an annular resilient sealing ring seated in one groove, and a lubrication gland seated in the other groove.

5. A device as defined in claim 2, wherein said reservoir tube sealing disk has a plurality of spaced circumferential areas of reduced diameter, an annular resilient sealing ring seated at one reduced diameter circumferential portion, and a synthetic resin guide ring seated in another reduced diameter circumferential portion and of slightly larger diameter than said disk.

6. A load leveling shock absorber for a vehicle comprising a closed hydraulic unit including a cylinder, an apertured piston unit in said cylinder accommodating liquid flow therethrough at different rates in opposite directions and a piston rod slidably projecting from said cylinder, a seal carried by said cylinder and encircling said piston rod, a concentric circular portion of larger diameter than said cylinder mounted on said cylinder adjacent to the end thereof at which said rod projects, an annular seal encircling said last named cylinder portion, a tubular member carried by the projecting part of said rod and slidably encircling said last named cylinder portion and last named seal, said tubular member having a closed outer end cooperating with said hydraulic unit, circular portion and seal to define a gas-confining chamber, gas inlet means for supplying gas at high pressure to said tubular member, and guide means carried by the end of the telescoping portion of said tubular member and slidable on the cylinder of said hydraulic unit for maintaining said tubular member and cylinder in substantially axial alignment in all relative positions thereof.

7. A load leveling shock absorber as defined in claim 6, wherein said last named means constitutes guide means carried by the end portion of said tubular member opposite the closed outer end thereof and slidable on the cylinder of said hydaulic unit.

8. A load leveling shock absorber as defined in claim 9, wherein said gas inlet means includes a container charged with gas at high pressure, selectively operable means interconnecting said container and said first cylinder to control the gas discharge in said first cylinder to selectively shift said first cylinder relative to said second cylinder, and pressure regulating means for limiting the pressure of gas supplied to said first cylinder from said container.

9. In a shock absorber normally mounted in compression between two relatively shiftable anchors, comprising a first cylinder open at one end and closed at the other end and including means at said closed end for securing said first cylinder to one anchor, a second cylinder having closed ends and comprising a hydraulic fluid shock absorber having an apertured piston accommodating flow of liquid therethrough at different rates in opposite directions and a piston rod in slidable sealed extension from one of said closed ends thereof, said second cylinder and said rod projecting into the open cavity of said first cylinder, said rod being rigidly secured to said first cylinder, annular means between the inner surface of said first cylinder and the outer surface of said second cylinder and carried by one of said cylinders and slidably engaged by the other cylinder for providing sliding axial movement and a seal between said first and second cylinders, said annular means cooperating with the end of said second cylinder from which said rod extends to define a closed chamber in said first cylinder, means at the other closed end of said second cylinder for securing said second cylinder to the other anchor, and inlet means communicating with said closed chamber for effecting flow of gaseous fluid into said closed chamber to establish a pressure differential between said closed chamber and atmosphere to control the spacing between said anchor securing means, whereby said first cylinder, said rod secured thereto and said apertured piston are selectively movable relative to said second cylinder in accordance with variations of the compression established by the relative movement of said anchors and also by said pressure differential between said closed chamber and atmosphere.

10. A load leveling shock absorber for a vehicle having a body, a running gear and spring suspension means, comprising an extensible and contractible unit to interconnect said body and running gear for damping vertical vehicle body movement incident to flexure of said spring suspension means, said unit comprising a cylindrical closed hydraulic housing, a piston slidable in said housing and having apertures therein accommodating flow of liquid therethrough at different rates in opposite directions, a piston rod carried by said piston and projecting from said housing, sealing means carried by said housing and sealingly encircling said piston rod, an enlarged concentric annular portion at the end of said housing from which said rod projects, a tubular member having a closed end carried by said rod and slidable on said annular housing portion, sealing means carried by said annular housing portion and encircled by said tubular member, means cooperating with and longitudinally spaced from said enlarged annular housing portion for positioning said housing and tubular member substantially in axial alignment in all relative positions thereof, said positioning means being carried by one of said housing portion and tubular member and engaged by the other, said housing, annular enlargement and sealing means defining a sealing closure slidable in said tubular member to define a sealed gas chamber therein, and gas intake means carried by said tubular member in communication with said chamber.

References Cited

UNITED STATES PATENTS

| | | |
|---|---|---|
| 820,707 | 5/1906 | Downer. |
| 1,003,916 | 9/1911 | Koenig 137—505.42 |
| 2,331,084 | 10/1943 | Sorensen 137—505.42 X |
| 3,042,392 | 7/1962 | Schmitz. |
| 3,043,302 | 7/1962 | Spears 137—505.42 X |
| 3,046,001 | 7/1962 | Schultze. |
| 3,083,026 | 3/1963 | Broadwell. |
| 3,104,119 | 9/1963 | Long 267—64 X |

FOREIGN PATENTS 217,855  2/1957  Australia.

BENJAMIN HERSH, *Primary Examiner.*

P. GOODMAN, *Assistant Examiner.*